E. H. REMDE.
VEHICLE BODY STRUCTURE.
APPLICATION FILED MAY 12, 1909.
958,940.
Patented May 24, 1910.
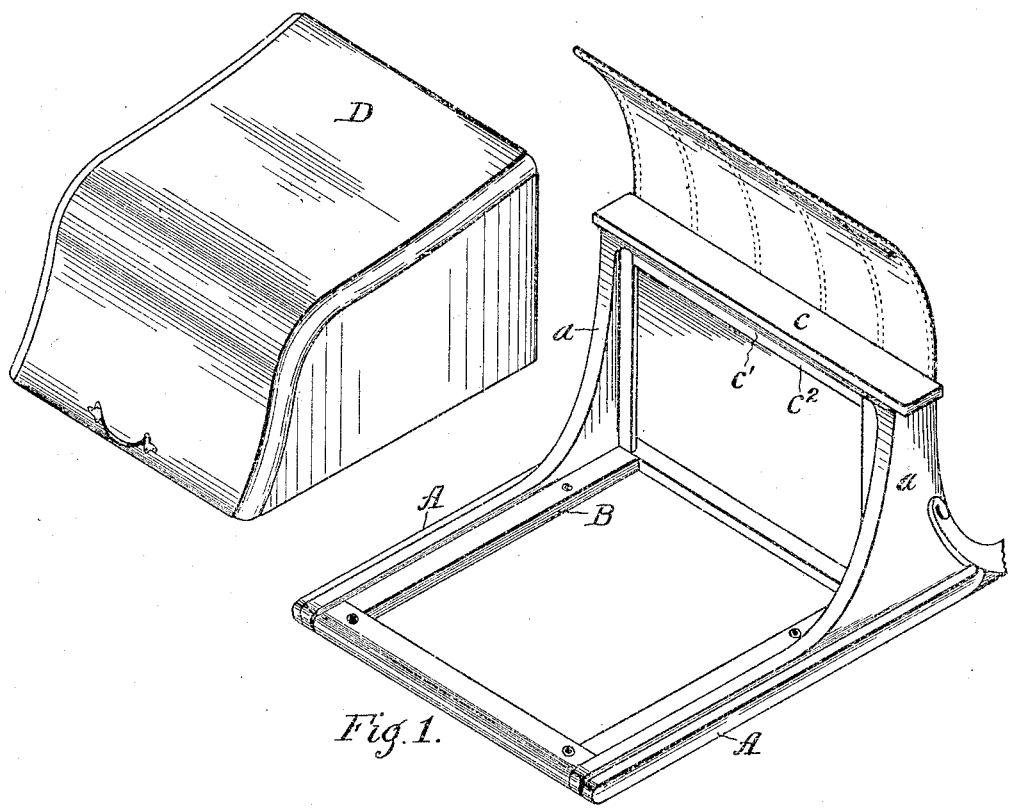
Fig. 1.
Fig. 2.
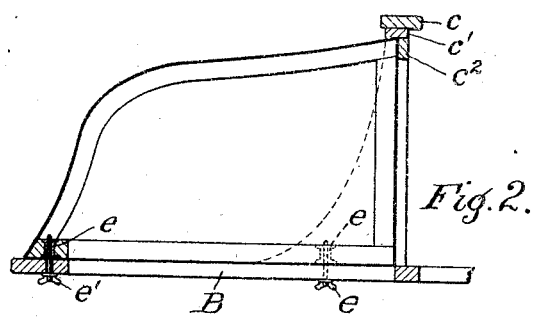
Witnesses
Herman Eisele
Curt B. Mueller
Inventor:
Edward H. Remde,
by A. C. Merkel
Attorney

UNITED STATES PATENT OFFICE.

EDWARD H. REMDE, OF CLEVELAND, OHIO, ASSIGNOR TO THE BAKER MOTOR VEHICLE COMPANY, OF CLEVELAND, OHIO, A CORPORATION OF OHIO.

VEHICLE-BODY STRUCTURE.

958,940.  Specification of Letters Patent.  Patented May 24, 1910.

Application filed May 12, 1909. Serial No. 495,500.

*To all whom it may concern:*

Be it known that I, EDWARD H. REMDE, a citizen of the United States, resident of Cleveland, county of Cuyahoga, and State of Ohio, have invented a new and useful Improvement in Vehicle-Body Structures, of which the following is a specification, the principle of the invention being herein explained and the best mode in which I have contemplated applying that principle, so as to distinguish it from other inventions.

My invention relates to vehicle bodies, and particularly to that class of bodies which is used in connection with motor vehicles which employ storage batteries as a source of motive power.

The object of the invention is to provide a body of the above described character which will be economical in its construction, favorable in its external appearance, and in which the battery cover may be readily removed and replaced in a suitable and secure manner.

The said invention consists of means hereinafter fully described, and particularly set forth in the claims.

The annexed drawing and the following description set forth in detail certain means embodying my invention, the disclosed means, however, constituting but one of various mechanical forms in which the principle of the invention may be used.

In said annexed drawing:—Figure 1 is a perspective view of the front portion of the vehicle body embodying my invention, showing the battery cover also in perspective and detached therefrom. Fig. 2 is a vertical transverse section of the cover and adjacent parts of the main body portion.

In the structure illustrated in the drawing, the lower side sills A A are extended forwardly, and between such forwardly extending portions is secured, usually by gluing, a horizontal frame B, upon which the batteries (not shown) directly rest. Extending upwardly from each of the side sills is a side member, $a$ $a$. The latter are permanently secured to the sills and terminate at their upper ends immediately below the lower surface of the cross bar $c$. In the particular form of vehicle shown in the drawing, a horizontal abutment member $c'$, is placed beneath the cross bar $c$ and joins the upper ends of the members $a$ $a$. A vertical frame $c^2$ is fixed between the members $a$ $a$, and limits the inward position of the cover D. Each side member $a$ is preferably curved from the top downwardly and outwardly toward the ends of the sills, as shown.

The battery cover D consists of closed sides, top and outer end, all permanently secured to each other to form one integral structure, the bottom and inner ends being open, as shown in Fig. 2. Such inner end is made substantially perpendicular to the bottom, as is shown, and the outer end is preferably given a curved form. The width of the battery case is such that its inner end may be placed between the upright members $a$ $a$, and its height is such that it may be placed beneath the member $c'$ of the transverse member C. It will thus be seen that when the cover is in position, the inner open end is completely hidden, which therefore lends to the favorable external appearance of the body.

The upper surface of the frame B is slightly depressed with reference to the upper surface of the sills A A, as shown in Fig. 1, by which arrangement the lower edges of the sides of the cover may be depressed below the upper adjacent edges of the sills. In this way the lower edges of the sides of the cover may be caused to assume a position below the upper surfaces of the adjacent parts of the sills, thereby concealing such lower edges and further contributing to the favorable outward appearance of the body.

Any suitable means may be provided for securing the cover in place, such as nuts $e$, embedded in or suitably secured to the cover D, and thumb-screws $e'$ passing through the frame B and engaging such nuts.

It is obvious that the above-described construction may be applied to the rear as well as to the front of the vehicle-body.

Having fully described my invention, what I claim therefore, and desire to secure by Letters Patent is:—

1. In a vehicle, the combination of a main body portion having an extension for supporting the battery, upright members contiguous to said extension and a transverse member; a battery cover having permanently secured sides, top and outer end; and suitable means for securing said cover to the main body portion; the inner end of the cover being placed between said upright members and beneath said transverse member.

2. In a vehicle, the combination of a main body portion having its sills extended to support the batteries; a transverse member; and upright members extending from the sills upwardly to said transverse member; a battery cover having permanently secured sides, top and outer end; and suitable means for securing the cover to said main body member; the inner end and bottom of the cover being open and said inner end being placed between said upright members and beneath said transverse member.

Signed by me, this 11th day of May, 1909.

EDWARD H. REMDE.

Attested by—
K. F. JUENGLING,
CURT B. MUELLER.